(12) United States Patent
Jansen et al.

(10) Patent No.: US 12,267,009 B2
(45) Date of Patent: Apr. 1, 2025

(54) AIR CONDITIONING DEVICE AND CORRESPONDING POWER SUPPLY INCLUDING A SINGLE BUCK CONVERTER WITH A SIC DIODE, AN ATTENUATOR AND A FERRITE BEAD

(71) Applicant: Copeland Europe GmbH, Berlin (DE)

(72) Inventors: Kurt Jansen, Aachen-Oberforstbach (DE); Alex Popa, Cluj-Napoca (RO); Izsak Kantor, Cluj-Napoca (RO); Abhishek Deshpande, Aachen (DE)

(73) Assignee: Copeland Europe GmbH, Berlin (DE)

( * ) Notice: Subject to any disclaimer, the term of this patent is extended or adjusted under 35 U.S.C. 154(b) by 122 days.

(21) Appl. No.: 17/957,696

(22) Filed: Sep. 30, 2022

(65) Prior Publication Data

US 2023/0107212 A1    Apr. 6, 2023

(30) Foreign Application Priority Data

Oct. 1, 2021 (EP) .................................... 21200467

(51) Int. Cl.
*H02M 3/156* (2006.01)
*F24F 11/88* (2018.01)
*H02M 1/34* (2007.01)

(52) U.S. Cl.
CPC ............. *H02M 3/156* (2013.01); *F24F 11/88* (2018.01); *H02M 1/348* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10;
(Continued)

(56) References Cited

U.S. PATENT DOCUMENTS 6,542,385 B1 * 4/2003 Emmons ........... H02M 3/33573
                                                                363/17
7,915,876 B2 * 3/2011 Orr ....................... H02M 3/155
                                                                323/259

(Continued)

FOREIGN PATENT DOCUMENTS

WO    WO-2006044934 A2    4/2006
WO    WO-2017171540 A1    10/2017
WO    WO-2017181071 A1    10/2017

OTHER PUBLICATIONS

Extended European Search Report for European Application No. 21200467.5 mailed on Mar. 4, 2022.
(Continued)

*Primary Examiner* — Jeffrey A Gblende

(57) ABSTRACT

An air conditioning device includes a buck converter which comprises a switching device, an inductor, a diode and at least one capacitor. The diode is a SiC diode, and the buck converter further includes an attenuator associated to the SiC diode and a ferrite bead associated to the switching device.

8 Claims, 3 Drawing Sheets

Figure 1:
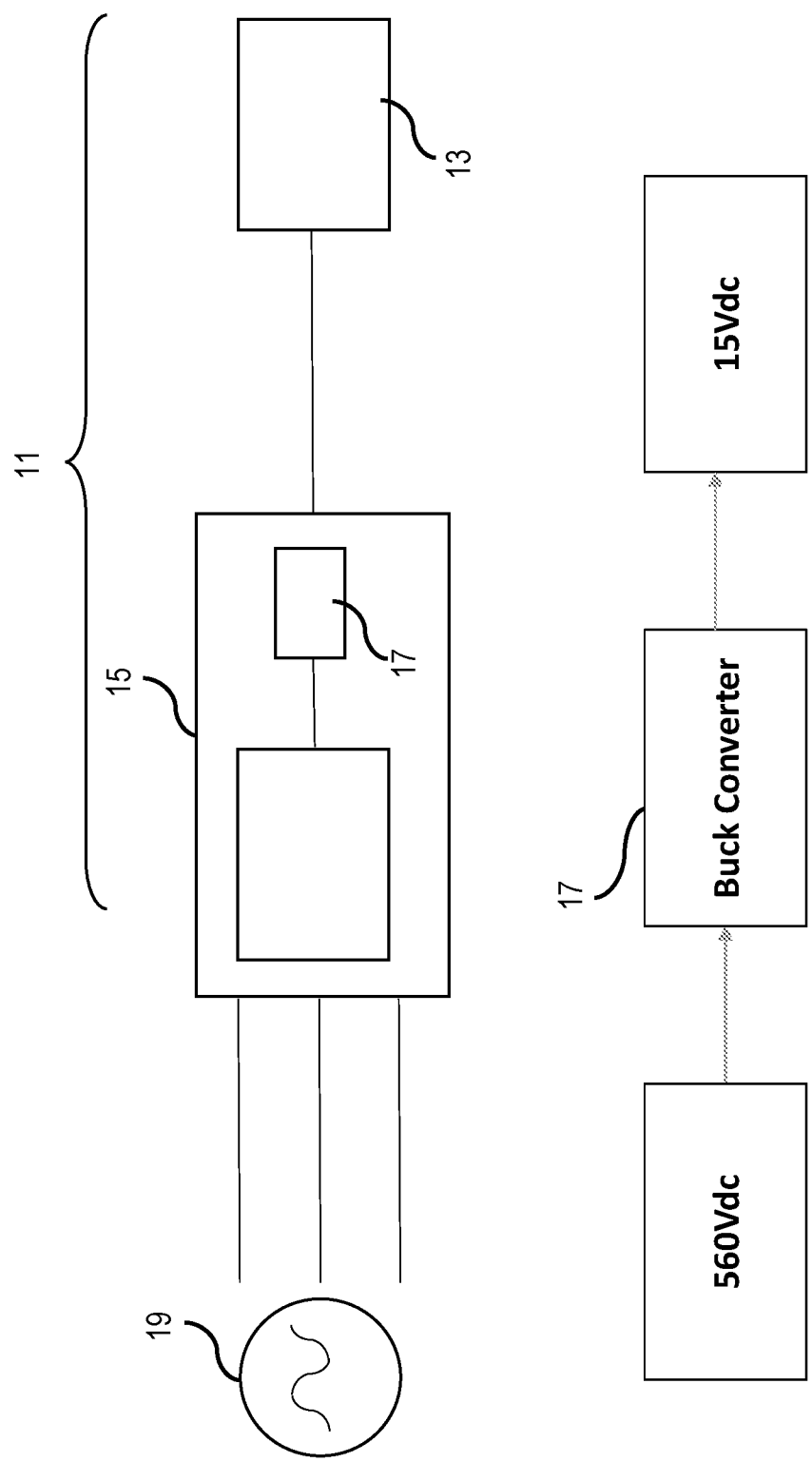

(58) Field of Classification Search
CPC ........ H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

(56) References Cited

U.S. PATENT DOCUMENTS

| | | | |
|---|---|---|---|
| 9,698,599 | B2 | 7/2017 | Stratakos et al. |
| 9,876,422 | B2 | 1/2018 | Grandy |
| 2007/0090818 | A1* | 4/2007 | Nishimori ............... H02M 1/15 323/282 |
| 2007/0229047 | A1 | 10/2007 | Sigamani et al. |
| 2013/0015836 | A1* | 1/2013 | Chang .................... H02M 3/155 323/351 |
| 2022/0227242 | A1* | 7/2022 | Schafmeister ............ H02J 7/02 |

OTHER PUBLICATIONS

Christopher Richardson et al. "Selecting and Using Ferrite Beads for Ringing Control in Switching Converters". Feb. 15, 2015, pp. 1-13, XP055345054, http://www.we-online.com; Retrieved from the Internet: URL:http://www.we-online.com/web/en/index.php/show/media/07/electronic_components/download_center_1/application_notes_berichte/smd_ferrite_zur_ueberschwingungssteuerung/Ferrite_Beads_for_Ringing_Control_EN.pdf [retrieved on Feb. 13, 2017] * p. 1; figure 1 *.

Piotr Czyz et al. "Performance Comparison of a 650 V GaN SSFET and CoolMOS". 2016 10th International Conference on Compatibility, Power Electronics and Power Engineering (CPE-Powereng), IEEE, Jun. 29, 2016 (Jun. 29, 2016), pp. 438-443, XP032946680, DOI: 10.1109/CPE.2016.7544228 [retrieved on Aug. 15, 2016] *p. 440-p. 442; figure 7 *.

Jih-Sheng Lai et al. "Design Optimization for Ultrahigh Efficiency Buck Regulator using Wide Bandgap Devices". 2015 IEEE Energy Conversion Congress and Exposition (ECCE), IEEE, Sep. 20, 2015 (Sep. 20, 2015), pp. 4797-4803, XP03201226, DOI: 10.1109/ECCE. 2015.7310337 [retrieved on Oct. 27, 2015] * p. 4800-p. 4801; figures 5-7 *.

"LM25576 Simple Switcher® 42V, 3A Step-Down Switching Regulator", Mar. 1, 2007 (Mar. 1, 2007), XP055101193, Retrieved from the Internet: URL:Http://www.bdtic.com/DataSheet/NS/LM25576.pdf [retrieved on Feb. 10, 2014] * p. 15: "R7, C11"; figure 1 *.

Yagnesh V. Waghela et al. "Switched Mode Power Supply design guidelines for smartphones and tablets for reducing RF emissions". 2016 International Conference on Electromagnetic Interference & Compatibility (INCEMIC), IEEE, Dec. 8, 2016 (Dec. 8, 2016), pp. 1-3, XP033093940, DOI: 10.1109/INCEMIC.2016.7921502 [retrieved on May 6, 2017] * figure 3 *.

* cited by examiner

AIR CONDITIONING DEVICE AND CORRESPONDING POWER SUPPLY INCLUDING A SINGLE BUCK CONVERTER WITH A SIC DIODE, AN ATTENUATOR AND A FERRITE BEAD

The invention relates to an air conditioning device including a buck converter which comprises a switching device, an inductor, a diode and at least one capacitor.

Buck or step-down converters are typically used in order to transform a higher input DC voltage to a lower output DC voltage. That is, the output voltage of the buck converter is always smaller than or equal to its input voltage. Such converters are mostly used to provide suitable voltages like 12 V or 5 V e.g. in vehicles, ships and planes or in charging devices. Another application may be providing a supply voltage for processors in notebooks, servers and personal computers.

Air conditioning devices may be connected to a three-phase power supply which is able to provide sufficient current. In such a three-phase drive or power supply, a direct current converter is usually required as an auxiliary power supply for some components the air conditioning device.

In order to generate such an auxiliary power, two solutions are most broadly used. The first is a flyback converter including a transformer to step down a high voltage to different voltage levels required by low voltage circuits on the drive for the air conditioning device. However, such a flyback converter requires a bulky transformer which implies that a product including the flyback converter becomes costlier and larger. In addition, the flyback converter may further increase the product cost since the transformer needs to be customized and qualified with respect to the requirements of the particular product, i.e. the air conditioning device.

The second solution refers to using two high voltage buck converters in parallel since a single buck converter is usually not sufficient to satisfy the power demand from low voltage circuits on the three-phase drive for the air conditioning device.

However, the use of two high voltage buck converters also entails increased cost since each buck converter needs a separate switching integrated circuit. Further, the design complexity is increased and a larger end product may be provided as a consequence. Furthermore, two buck converters may have an increased electromagnetic interference (EMI).

It is therefore an object of the invention to provide an air conditioning device including a buck converter which provides sufficient output current without disturbances e.g. due to a high ripple current or due to current spikes.

This object is satisfied by an air conditioning device comprising the features of claim 1.

The air conditioning device includes a buck converter which comprises a switching device, an inductor, a diode and at least one capacitor. The diode is a SiC diode, and the buck converter further includes an attenuator associated to the SiC diode and a ferrite bead associated to the switching device.

The buck converter may also be referred to as direct current converter or as step-down converter. That is, the buck converter converts a high direct current voltage to low direct current voltages being suitable for further components of the air conditioning device.

A SiC diode has a negligible recovery time, in contrast to Si diodes which are typically used in buck converters. Therefore, current spikes are eliminated or at least strongly reduced due to the SiC diode which otherwise would occur, especially during a continuous current mode (CCM) of the buck converter. The elimination or reduction of current spikes by the SiC diode allows to increase the inductivity of the inductor. As a consequence, the output current of the buck converter increases.

Due to the attenuator associated to the SiC diode, the occurrence of current spikes during a startup of the air conditioning device and the buck converter can be prevented. Furthermore, the attenuator also helps in reducing current spikes during normal operation after the startup. Such current spikes could otherwise occur due to the body capacitance between the diode and ground. Since such current spikes could also occur due to a leakage capacitance between the switching device and ground, the ferrite bead associated to the switching device also contributes to suppressing current spikes during startup.

In summary, the use of a SiC diode, of the attenuator and of the ferrite bead in the buck converter has a synergistic effect on reducing current spikes during startup and during operation of the air conditioning device. Since this also allows increasing the inductivity of the inductor, as mentioned above, a ripple current of the buck converter may also be reduced. In the mostly discontinuous current mode of a buck converter, a high ripple current can occur which may heat up the buck converter such that a thermal protection is triggered. Due to the possibility of increasing the inductivity, the ripple current of the buck converter can be reduced in such a manner that triggering the thermal protection can be avoided. Moreover, with a higher inductivity the buck converter may operate in a continuous current mode for a longer time. Due to the increase of the output current a single buck converter having a single switching device may be sufficient for the power supply of further components of the air conditioning device. This results in a smaller buck converter and in lower cost for the air conditioning device.

Embodiments of the invention are given in the subclaims, the description and the drawings.

According to an embodiment, the inductor has an inductivity equal to or greater than 4.7 mH. By increasing the inductivity to such a value, it is ensured that the ripple current of the buck converter will be low enough such that triggering the thermal protection of the buck converter will generally be avoided. The high inductivity may further increase the time period for which the buck converter will be able to operate in the continuous current mode.

The ferrite bead may be connected to an input of the switching device. By such an arrangement, the risk of current spikes during the startup may further be reduced.

The attenuator may include a snubber circuit connected to the SiC diode, wherein the snubber circuit is preferably connected in parallel to the SiC diode. Such a snubber circuit generally includes a resistor and a capacitor connected in series, i.e. a standard RC element. Hence, the snubber circuit is a low-cost implementation of the attenuator.

According to a further embodiment, the buck converter may be free of a ground plane below the inductor, the SiC diode and/or the switching device. The removal of the ground plane below one or all these elements may further reduce the risk of current spikes during the startup of the buck converter and of the air conditioning device as well as during their operation after the startup.

The buck converter may be configured for an output voltage from 70 to 560 V DC. In addition, the buck converter may provide an output voltage of 15 V DC. Hence, the buck converter may have a high flexibility regarding the input voltage. On the other hand, the buck converter may be able to provide a standard output voltage suitable for the further components of the air conditioning device.

In another aspect, the invention relates to a buck converter comprising a switching device, an inductor, a SiC diode and at least one capacitor. The buck converter further includes an attenuator associated to the SiC diode and a ferrite bead associated to the switching device. The attenuator may be a snubber circuit, and the inductor may have an inductivity equal to or greater than 4.7 mH. The snubber circuit may be connected in parallel to the SiC diode, whereas the ferrite bead may be connected to an input of the switching device.

In a further aspect, the invention relates to a power supply device including a single buck converter which comprises a switching device, an inductor, a SiC diode and at least one capacitor. The buck converter further includes an attenuator associated to the SiC diode, and a ferrite bead associated to the switching device.

As described above, the use of the SiC diode, of the attenuator and of the ferrite bead in the buck converter strongly reduces the occurrence of current spikes during the startup and the operation of the power supply device. Therefore, the inductivity of the inductor can be increased which reduces the ripple current of the buck converter and allows a greater output current. Therefore, the power supply device needs a single buck converter only, i.e. instead of two buck converters which are usually implemented. Therefore, the size and the cost of the power supply device is reduced.

Exemplary embodiments and functions of the present invention are described herein in conjunction with the following drawings.

Figure 2:
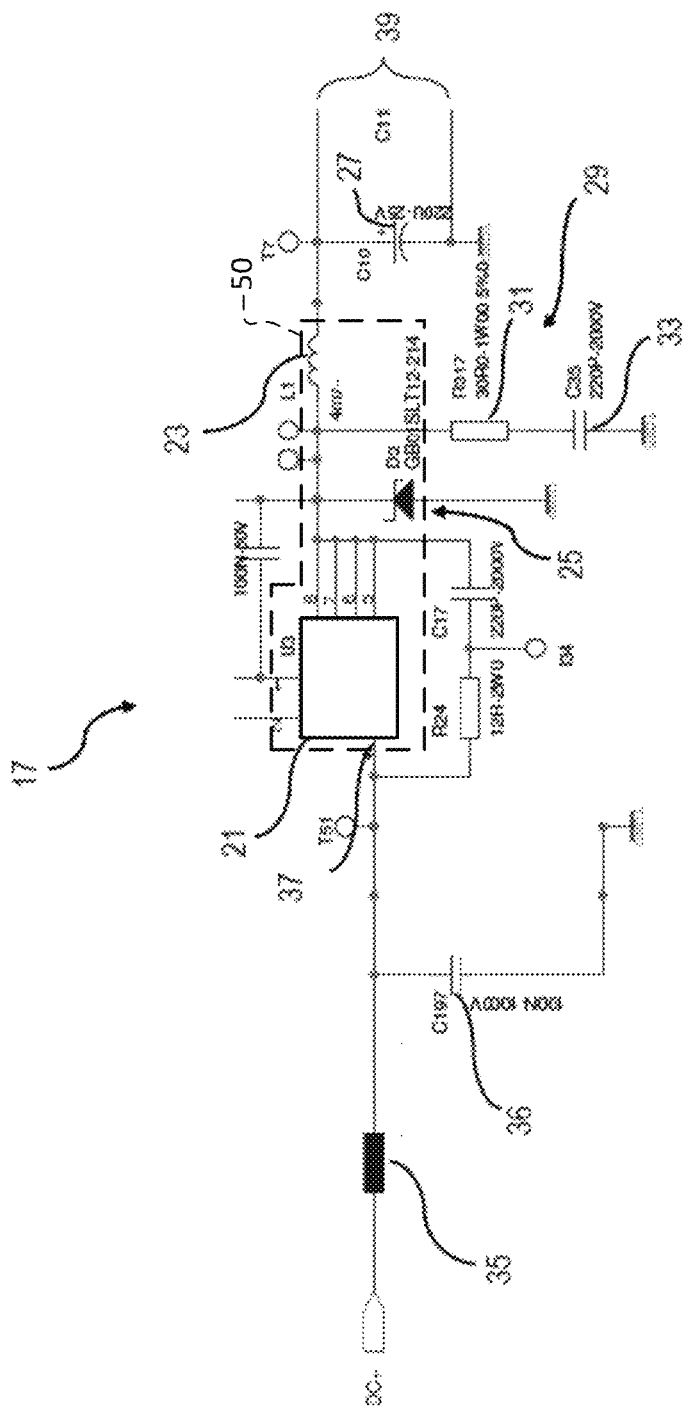
Figure 3:
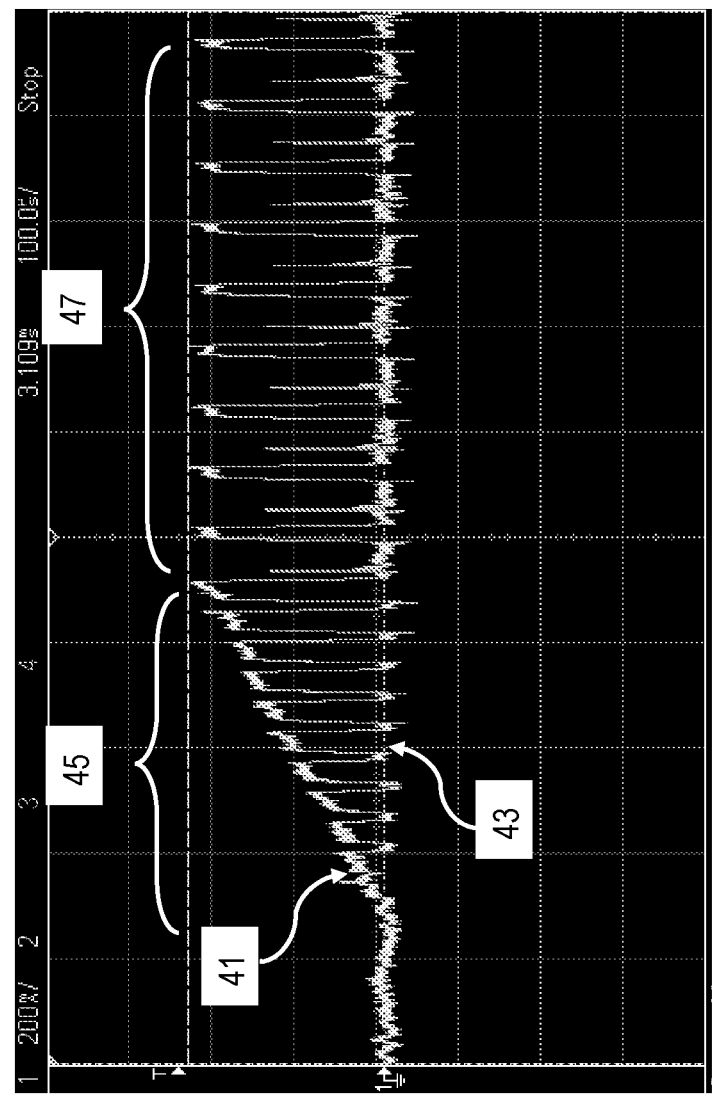

FIG. 1 schematically depicts an overview of an air conditioning device including a buck converter, FIG. 2 depicts details of the buck converter as shown in FIG. 1, and FIG. 3 depicts test results for the buck converter as shown in FIGS. 1 and 2.

FIG. 1 depicts a schematic overview of an air conditioning device 11 which includes an air conditioning unit 13 and a drive or power supply 15. The air conditioning unit 13 includes further elements (not shown) for influencing the climate within a room in which the air conditioning device 11 is installed. The power supply 15 is connected at its input side to a source 19 for three-phase alternating current.

The power supply 15 includes a buck converter 17 which is used as an auxiliary power supply for low voltage circuits. In detail, the buck converter 17 provides power to a microprocessor and to safety circuits within the drive or power supply 15. Therefore, the buck converter 17 is a critical element for a safe and reliable operation of the power supply or drive 15.

As depicted in the lower diagram of FIG. 1, the buck converter 17 is configured for a maximum input voltage of 560 V direct current. Generally, the buck converter 17 is suitable for an input voltage from 70 to 560 V direct current. On the output side, the buck converter 17 provides 15 V direct current, wherein the output current is approximately 310 mA. Furthermore, the buck converter 17 and the power supply 15 are configured for a maximum ambient temperature of about 60 to 80° C.

FIG. 2 depicts the buck converter 17 in detail. The buck converter 17 includes a switching device 21, an inductor 23, a diode 25 and an output capacitor 27. These are usual components of a buck or step-down converter for converting a higher direct current voltage to a lower direct current voltage. The switching device 21 is typically based on a transistor and may be referred to as a single offline switcher.

In the buck converter 17 as shown in FIG. 2, the diode 25 is a SiC diode, and the buck converter 17 further includes a snubber circuit 29 which is connected in parallel to the diode 25. The snubber circuit 29 is an RC element including a resistor 31 and a capacitor 33. In addition, a ferrite bead 35 and a further capacitor 36 are connected to an input 37 of the switching device 21.

During operation, the switching device 21 periodically switches between ON and OFF. During time periods when the switching device 21 is switched off, the inductor 23 and the output capacitor 27 further provide an output voltage 39 of the buck converter 17 due to the energy which is stored in the inductor 23 and the output capacitor 27. During such time periods, i.e. when the switching device 21 is switched on, the diode 25 is blocking, whereas during the time periods when the switching device 21 is switched off, current flows through the diode 25 and through the inductor 23 for further providing the output voltage 39.

By controlling the switching device 21, the buck converter 17 is either operated in a continuous current mode (CCM) in which the current flowing through the inductor 23 does not stop. That is, the switching device 21 is switched on again before the magnetic energy of the inductor 23 completely disappears. Furthermore, the buck converter 17 can be operated in a discontinuous current mode (DCM) or a mostly discontinuous current mode (MDCM). In these modes, a gap phase without current through the inductor 23 exists, and the output voltage 39 of the buck converter 7 is provided by the output capacitor 27 only. Since the inductor 23 generally provides an alternating current contribution to the output voltage 39, the buck converter 17 also outputs a ripple current, i.e. in addition to a direct current. Furthermore, current spikes may occur, especially during a startup phase of the buck converter 17. A high ripple current usually heats up the entire buck converter 17 and the power supply 15, which may even trigger a thermal protection (not shown) of the power supply 15.

The ripple current is suppressed by increasing the inductivity of the inductor 23 to 4.7 mH or more. At such an inductivity, it turned out that the ripple current is low enough not to trigger any thermal protection. In addition, the buck converter 17 is able to operate in the continuous current mode (CCM) for a longer time.

The current spikes at the output of the buck converter 17 are typically caused by a recovery time of a Si diode which is used in conventional buck converters. It turned out that the recovery time could not be made short enough by using Si diodes. Therefore, the buck converter 17 is equipped with a SiC diode which has a negligible recovery time. Hence, current spikes caused by the diode are eliminated or at least strongly reduced.

Further, current spikes can be provoked during the startup by the body capacitance between the diode and ground. In order to avoid such current spikes, the snubber circuit 29 is connected in parallel to the diode 25 as an attenuator. Furthermore, the ferrite bead 35 suppresses the occurrence of current spikes during startup. In addition, a ground plane has been removed below the switching device 21, the inductor 23 and the SiC diode 25 in order to further avoid any occurrence of current spikes during startup. The absence of a ground plane below the switching device 21, the inductor 23 and the SiC diode 25 is represented by dashed box 50.

In summary, the SiC diode 25, the snubber circuit 29 and the ferrite bead 35 provide a synergistic effect in strongly reducing current spikes at the output of the buck converter 17. Due to the increased inductivity of the inductor 23, the buck converter 17 is able to provide a high output current of approximately 310 mA direct current. Therefore, the power supply 15 (see FIG. 1) is equipped with a single buck converter 17 only, i.e. instead of two buck converters which are usually applied. Hence, the size and the cost of the power supply 15 are reduced.

FIG. 3 depicts test results for the buck converter 17 as shown in FIGS. 1 and 2. In FIG. 3, the drain current 41 of the switching device 21 is represented on the y-axis over time 43 on the x-axis. In the curve of the drain current 41, one can recognize the small time periods for which the switching device 21 turns on and off. In addition, a startup period 45 and an operation period 47 are depicted. During the operation period 47, a current peak of 475 mA is reached whereas an output current of approximately 310 mA DC is provided by the buck converter 17.

As can be seen in the test results of FIG. 3, no current spikes occur during the startup period 45, and during the operation period 47, small current spikes are recognizable only. Due to the reduced ripple current, the temperature at the switching device 21 is no more than about 80° C. This is well below an overtemperature threshold of 142° C. which is typically used by the thermal protection of the power supply 15.

REFERENCE NUMERAL LIST 11 air conditioning device
13 air conditioning unit
15 drive or power supply
17 buck converter
19 current source
21 switching device
23 inductor
25 diode
27 output capacitor
29 snubber circuit
31 resistor
33 capacitor
35 ferrite bead
36 capacitor
37 input of switching device
39 output voltage of the buck converter
41 drain current of the switching device
43 time
45 startup period
47 operation period

The invention claimed is:

1. An air conditioning device comprising:
an air conditioning unit; and
a power supply,
wherein
the power supply comprises a single buck converter, wherein the single buck converter comprises a switching device, an inductor, a diode and at least one capacitor,
the inductor has an inductivity equal to or greater than 4.7 mH,
the diode is a SiC diode,
the single buck converter further includes
an attenuator connected in parallel with the SiC diode, and
a ferrite bead connected to the switching device, and
the switching device is configured to switch between ON and OFF states to operate the single buck converter in a continuous current mode during which current flowing through the inductor does not stop.

2. The air conditioning device according to claim 1, wherein the ferrite bead is connected to an input of the switching device.

3. The air conditioning device according to claim 1, wherein the attenuator includes a snubber circuit connected to the SiC diode.

4. The air conditioning device according to claim 3, wherein the snubber circuit is connected in parallel with the SiC diode.

5. The air conditioning device according to claim 1, wherein the single buck converter is free of a ground plane below the inductor, the SiC diode and the switching device.

6. The air conditioning device according to claim 1, wherein the single buck converter is configured for an input voltage from 70 to 560 V DC.

7. The air conditioning device according to claim 1, wherein the single buck converter provides an output voltage 15V DC.

8. A power supply comprising a single buck converter, which includes a switching device, an inductor, a diode and at least one capacitor, wherein:
the inductor has an inductivity equal to or greater than 4.7 mH;
the diode is a SiC diode;
the single buck converter further includes
an attenuator connected in parallel with the SiC diode, and
a ferrite bead connected to the switching device; and
the switching device is configured to switch between ON and OFF states to operate the single buck converter in a continuous current mode during which current flowing through the inductor does not stop.

* * * * *